J. O. NELSON.
SPRING WHEEL.
APPLICATION FILED APR. 18, 1912.

1,112,718. Patented Oct. 6, 1914.

Witnesses
R. H. Jones
Francis Boyle

Inventor
J. O. Nelson.
By
Attorneys

UNITED STATES PATENT OFFICE.

JOHN O. NELSON, OF ASHTABULA, OHIO.

SPRING-WHEEL.

1,112,718.  Specification of Letters Patent.  Patented Oct. 6, 1914.

Application filed April 18, 1912. Serial No. 691,551.

*To all whom it may concern:*

Be it known that I, JOHN O. NELSON, a citizen of the United States, residing at Ashtabula, in the county of Ashtabula, State of Ohio, have invented certain new and useful Improvements in Spring-Wheels; and I do hereby declare the following to be a full, clear, and exact description of the invention, such as will enable others skilled in the art to which it appertains to make and use the same.

This invention relates to spring wheels and has for an object to provide a novel tire for attachment to the wooden felly of the wheel, the tire being formed of sections which yield relatively to each other upon striking an obstruction, this yielding taking place more especially at the section impinging against the obstruction so that the entire rim of the wheel is not affected as in many of the ordinary devices of this character now in use.

With the above object in view the invention consists of certain novel details of construction and combination of parts hereinafter fully described and claimed, it being understood that various modifications may be made in the minor details of construction within the scope of the appended claim.

Figure 1:
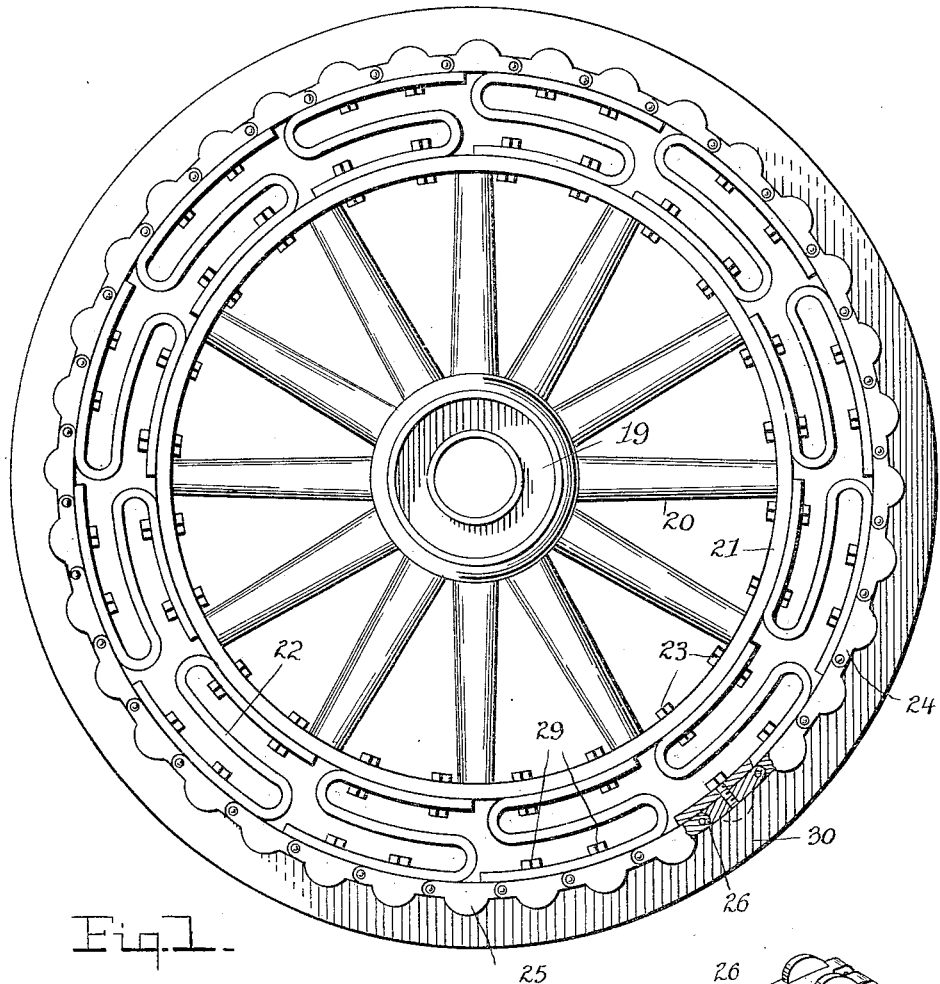
Figure 2:
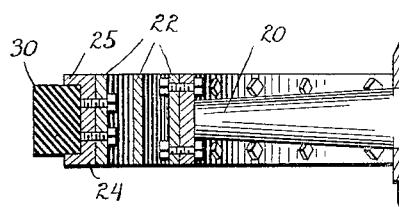
Figure 3:
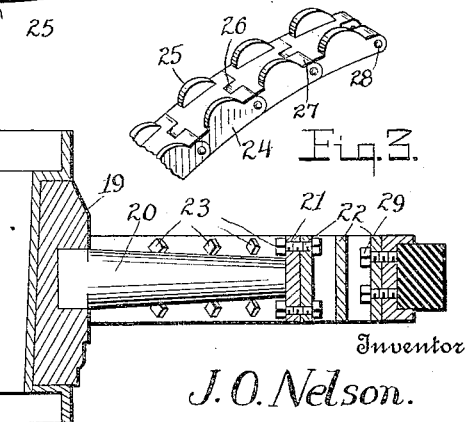

In the accompanying drawings forming part of this specification: Figure 1 is a side elevation of the wheel. Fig. 2 is a cross sectional view through the wheel. Fig. 3 is a fragmentary perspective view of the jointed metal rim.

The wheel is shown to comprise a hub 19, spokes 20, and a metal band 21 which connects the spokes and corresponds to an ordinary felly. A plurality of S-shaped springs 22 are seated on the outer face of the band between the spokes and are secured in position through the instrumentality of bolts 23 passed through the band as shown.

A jointed metal rim connects the springs and consists of a plurality of sections 24 each having spaced parallel lugs 25 on the outer face, and each having a tongue 26 on one end which fits between spaced tongues 27 formed on the confronting end of the next adjacent section, and a pivot pin 28 is passed through these tongues to pivotally secure the sections together. Bolts 29 are passed through each spring and through two adjacent sections of the rim as shown. A band tire 30 is seated between the lugs 25 and encircles all the sections. The outer lobe of each spring extends along the inner periphery of four contiguous sections and the bolts 29 of each spring are passed through said lobe and through the two intermediate sections of said four sections. Said intermediate sections act as one rigid link since that portion of the spring carrying the bolts, on account of its constant length, prevents any appreciable pivotal action between said intermediate sections. But the terminal sections of said four sections are free to pivot against the pressure of the ends of the lobe of the spring whereby said terminal sections alone yield to cushion the wheel against shock.

By virtue of the jointed metal rim connecting the springs together as above described a yielding of any particular spring upon the wheel striking an obstruction will not be communicated to an appreciable extent to the neighboring spring so that the yielding is confined to a point directly over the obstruction and is not distributed throughout the entire wheel rim.

What is claimed, is:—

The combination with a vehicle wheel of a spring tire including a plurality of substantially S-shaped springs having the inner lobes secured to the wheel felly, a jointed metal band connecting the outer lobes of said springs and comprising a plurality of curved sections each having tire retaining means on the outer face, and the end edge of each section having a tongue fitting in a groove formed in the adjacent end of the next section, a pivot pin passed through said tongue and groove of each two sections, the outer lobe of each of said springs extending along the inner peripheries of substantially four of said sections, bolts passed through said lobe and the two intermediate sections of said four sections, and a continuous flexible tire surrounding said jointed metal band.

In testimony whereof, I affix my signature, in presence of two witnesses.

JOHN O. NELSON.

Witnesses:
 EARL J. HOWARD,
 LOIS M. STARKEY.